United States Patent
Maeda et al.

(10) Patent No.: US 11,972,880 B2
(45) Date of Patent: Apr. 30, 2024

(54) WIRE WATERPROOF STRUCTURE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yusaku Maeda, Yokkaichi (JP); Takashi Takada, Yokkaichi (JP); Kenji Ito, Yokkaichi (JP)

(73) Assignees: SUMITOMO WIRING SYSTEMS, LTD., Mie (JP); AUTONETWORKS TECHNOLOGIES, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 805 days.

(21) Appl. No.: 16/981,668

(22) PCT Filed: Mar. 6, 2019

(86) PCT No.: PCT/JP2019/008789
§ 371 (c)(1),
(2) Date: Sep. 16, 2020

(87) PCT Pub. No.: WO2019/188062
PCT Pub. Date: Oct. 3, 2019

(65) Prior Publication Data
US 2021/0098152 A1     Apr. 1, 2021

(30) Foreign Application Priority Data
Mar. 30, 2018   (JP) ................................. 2018-066578

(51) Int. Cl.
*B32B 41/00*      (2006.01)
*C08F 2/14*       (2006.01)
(Continued)

(52) U.S. Cl.
CPC ............... *H01B 7/285* (2013.01); *C08F 2/14* (2013.01); *H01B 13/323* (2013.01); *H02G 3/088* (2013.01); *H02G 15/04* (2013.01)

(58) Field of Classification Search
CPC ......... H01B 7/285; H01B 13/323; C08F 2/14; H02G 3/088; H02G 15/04; H02G 15/043
(Continued)

(56) References Cited

U.S. PATENT DOCUMENTS

2012/0295103 A1    11/2012   Kikuno et al.
2017/0243673 A1*   8/2017    Nakashima ............ C09J 133/14

FOREIGN PATENT DOCUMENTS

CN    106414612 A  *  2/2017  ............ C08G 77/08
JP    H09-237526 A     9/1997
(Continued)

OTHER PUBLICATIONS

May 7, 2019 International Search Report issued in International Patent Application No. PCT/JP2019/008789.

*Primary Examiner* — Michael N Orlando
*Assistant Examiner* — Joshel Rivera
(74) *Attorney, Agent, or Firm* — Oliff PLC

(57) ABSTRACT

A wire waterproof structure including a water-stopping material, wherein: the water-stopping material is configured to seal at least a partial region of a conductor comprising an assembly of a plurality of strands, the water-stopping material contains a resin material, and a filler dispersed in the resin material, and the filler has an average particle size of 1 μm or more and 15% or less of an outer diameter of the strands, and a content in the water-stopping material of 1 mass % or more and 20 mass % or less, relative to the resin material.

20 Claims, 2 Drawing Sheets

(51) Int. Cl.
  *H01B 7/285* (2006.01)
  *H01B 13/32* (2006.01)
  *H02G 3/08* (2006.01)
  *H02G 15/04* (2006.01)

(58) Field of Classification Search
  USPC .................. 156/60, 64, 350, 351, 378, 379
  See application file for complete search history.

(56) References Cited

FOREIGN PATENT DOCUMENTS

| | | |
|---|---|---|
| JP | H10-243539 A | 9/1998 |
| JP | 2017-103096 A | 6/2017 |

\* cited by examiner

WIRE WATERPROOF STRUCTURE

BACKGROUND

The disclosure relates to a wire waterproof structure, and more particularly relates to a waterproof structure for waterproofing a wire conductor using a water-stopping material in a spliced section of a wire end, and the like.

Wires formed by covering the outer circumference of a conductor with an insulating covering are often provided with a portion at which the insulating covering is removed to expose the conductor from the insulating covering in order to, for example, join the conductors between a plurality of such wires. When a portion at which the conductor is exposed in this manner is provided at a location where the wire may possibly come into contact with water, waterproofing is performed for the exposed conductor. Wires for use in vehicles such as an automobile, vessels, aircrafts, and machines and the like may frequently come into contact with water, and, therefore, there is a particularly high need for providing the wires with such a waterproof structure.

As an example of a wire waterproof structure, JP 10-243539A discloses a spliced-wire waterproof structure including a spliced wire that includes strips of a plurality of coated wires that are joined to each other, a synthetic resin cap that is placed on the joined sections of the spliced wire and the vicinity thereof, and a resin layer that fixes the spliced wire to the cap and the coated wires to each other by closing gaps therebetween in the cap. The resin layer is formed by curing an uncured resin such as an epoxy resin or a polyurethane resin.

SUMMARY

As in the case of the waterproof structure disclosed in JP 10-243539A, when forming, at the portion of the wire where the conductor is exposed, a waterproof structure using a water-stopping material, the addition of a filler made of an organic polymer material or an inorganic material to a resin material made of an epoxy resin or the like may make it possible to impart properties such as toughness or mechanical strength to the water-stopping material, or improve the properties of the water-stopping material such as waterproofness. However, if the wire conductor includes an assembly of a plurality of strands, the entire portion in which the waterproof structure is to be formed, including minute voids formed between the strands, needs to be highly uniformly filled with the water-stopping material containing the filler in order to waterproof the conductor. If there is a portion that is not sufficiently filled with the water-stopping material, it is difficult to ensure sufficient waterproofness as the waterproof structure as a whole. In addition, if the distribution of the filler in the water-stopping material is nonuniform, a portion where the property imparting or improving effect of the filler cannot be sufficiently achieved may be generated in the waterproof structure.

An exemplary aspect of the disclosure provides a wire waterproof structure that allows a water-stopping material containing a filler to highly uniformly fill a conductor including an assembly of a plurality of strands when waterproofing the conductor using the water-stopping material.

A wire waterproof structure according to an exemplary aspects includes a water-stopping material, wherein: the water-stopping material is configured to seal at least a partial region of a conductor comprising an assembly of a plurality of strands, the water-stopping material contains a resin material, and a filler dispersed in the resin material, and the filler has an average particle size of 1 μm or more and 15% or less of an outer diameter of the strands, and a content in the water-stopping material of 1 mass % or more and 20 mass % or less, relative to the resin material.

Here, the average particle size of the filler may be 10 μm or less.

The filler may be a soft filler made of a rubber or an elastomer. In this case, the soft filler may contain at least one material selected from the group consisting of acrylic rubbers, urethane rubbers, silicone rubbers, fluorine rubbers, chloroprene rubbers, nitrile-butadiene rubbers, styrene-butadiene rubbers, butadiene rubbers, ethylene-propylene rubbers, butyl rubbers, isoprene rubbers, polyester-based elastomers, polyamide-based elastomers, and polyurethane-based elastomers. A Young's modulus of the water-stopping material to which the soft filler has been added may be at least 10% less than a Young's modulus thereof to which the soft filler is not added.

Alternatively, the filler may be a hard filler made of an inorganic compound. In this case, the hard filler may contain at least one compound selected from the group consisting of metal oxides, metal nitrides, metal carbides, metal oxynitrides, metal carbonitrides, metal carbonates, and metal silicates. A coefficient of linear expansion of the water-stopping material to which the hard filler has been added may be at least 5% lower than a coefficient of linear expansion thereof to which the hard filler is not added. A tensile strength of the water-stopping material to which the hard filler has been added may be at least 20% higher than a tensile strength thereof to which the hard filler is not added.

The water-stopping material may be made of a cured product of a resin composition having at least one curability selected from the group consisting of heat curability, moisture curability, two-part curability, and photocurability. In this case, viscosity of the resin composition that is not cured may be 9000 mPa·s or less at room temperature.

The water-stopping material may contain at least one resin material selected from the group consisting of epoxy-based resins, acrylic resins, urethane-based resins, silicone-based resins, polyamide-based resins, and polyolefin-based resins. The water-stopping material may contain at least one additive selected from the group consisting of antioxidants, colorants, light absorbers, photostabilizers, antifoaming agents, curing agents, adhesion aids, leveling agents, surfactants, storage stabilizers, polymerization inhibitors, plasticizers, lubricants, and aging inhibitors. In this case, among the additives, a particulate additive may have a particle size of 1 μm or more and 15% or less of an outer diameter of the strands.

The waterproof structure may be a waterproof structure in which a spliced section in which conductors of a plurality of wires are exposed and joined to each other at an end portion thereof is accommodated in a cap member, and the inside of the cap member is filled with the water-stopping material. In this case, the cap member may contain at least one resin material selected from the group consisting of polyolefins, halogen-based polymers, thermoplastic elastomers, and rubbers. The water-stopping material may be made of a cured product of a resin composition having photocurability, and a material that forms the cap may have a transmittance to light capable of photocuring the resin composition that forms the water-stopping material. The cap may be made of a heat-shrinkable material, and is heat-shrunk. At an end of the plurality of wires that includes the spliced section, regions of: a space between the plurality of wires; a space between the conductor and the insulating covering of each of the plurality of wires; and a void between the strands constituting the conductor of each of the plurality of wires may be filled with the water-stopping material.

Advantageous Effects of Disclosure

In the above-described wire waterproof structure, in the water-stopping material that forms the waterproof structure, the average particle size of the filler dispersed in the resin material is 1 µm or more and 15% or less of the outer diameter of the strands. In addition, the content of the filler is 1 mass % or more and 20 mass % or less, relative to the resin material. Because the particle size and the content of the filler are set as described above, the filler can be easily dispersed even in minute voids between the strands constituting the conductor, in an amount sufficient to achieve the effect in imparting properties or improving a property such as waterproofness. In addition, when the water-stopping material is brought into contact with the conductor in the state of a liquid composition, an excessive increase in the viscosity of the composition is less likely to occur, and, therefore, the composition is likely to permeate even the minute voids between the strands. Through these effects, it is possible to cause a water-stopping material containing a filler to highly uniformly fill portions to be waterproofed, including minute voids between strands. As a result, it is possible to ensure high waterproofness in various sections of the waterproof structure, and utilize the property imparting or improving effect of the filler.

Here, when the average particle size of the filler is 10 µm or less, it is possible to particularly efficiently distribute the filler in the minute voids between the strands constituting the conductor.

When the filler is a soft filler made of a rubber or an elastomer, dispersing the soft filler in the water-stopping material makes it possible to impart toughness to the water-stopping material, and reduce the modulus of elasticity of the water-stopping material. As a result, it is possible to reduce the thermal stress generated in the water-stopping material, thus making it possible to suppress a reduction in waterproofness caused by the occurrence of cracking in the water-stopping material even if the waterproof structure is placed under an environment where it is subjected to repeated cooling and heating.

Specific examples such a soft filler include those containing at least one material selected from the group consisting of acrylic rubbers, urethane rubbers, silicone rubbers, fluorine rubbers, chloroprene rubbers, nitrile-butadiene rubbers, styrene-butadiene rubbers, butadiene rubbers, ethylene-propylene rubbers, butyl rubbers, isoprene rubbers, polyester-based elastomers, polyamide-based elastomers, and polyurethane-based elastomers.

When the Young's modulus of the water-stopping material to which the soft filler has been added is at least 10% less than a Young's modulus thereof to which the soft filler is not added, it is possible to effectively improve the thermal shock resistance of the water-stopping material.

Alternatively, when the filler is a hard filler made of an inorganic compound, dispersing the hard filler in the water-stopping material makes is possible to improve the mechanical strength of the water-stopping material, and reduce the coefficient of linear expansion. As a result, it is possible to reduce the thermal stress generated in the water-stopping material, thus making it possible to suppress a reduction in waterproofness caused by the occurrence of cracking in the water-stopping material even under a cooling-heating environment.

Specific examples of such a hard filler include those containing at least one compound selected from the group consisting of metal oxides, metal nitrides, metal carbides, metal oxynitrides, metal carbonitrides, metal carbonates, and metal silicates. Among these, metal oxides, metal nitrides, metal carbides, metal oxynitrides, and metal carbonitrides are preferable in that they have a particularly high hardness.

When the coefficient of linear expansion of the water-stopping material to which the hard filler has been added is at least 5% lower than a coefficient of linear expansion thereof to which the hard filler is not added, it is possible to effectively increase the thermal shock resistance of the water-stopping material.

When the tensile strength of the water-stopping material to which the hard filler has been added is at least 20% higher than a tensile strength thereof to which the hard filler is not added, it is possible to effectively improve the mechanical strength of the water-stopping material.

When the water-stopping material is made of a cured product of a resin composition having at least one curability selected from the group consisting of heat curability, moisture curability, two-part curability, and photocurability, it is possible to easily cause the resin composition to uniformly permeate even the minute voids between the strands constituting the conductor by preparing the resin composition in an uncured, liquid state, and bringing the resin composition into contact with a portion where the waterproof structure is to be formed. By curing the resin composition, it is possible to produce a waterproof structure in which minute spaces between the strands are highly uniformly filled with the water-stopping material containing the filler. In particular, when the water-stopping material is made of a cured product of a resin composition having heat curability, it is possible to perform curing easily.

In this case, when the viscosity of the resin composition that is not cured is 9000 mPa·s or less at room temperature, it is possible to easily cause the resin composition to sufficiently permeate the voids between the strands.

Specific examples of the water-stopping material include those containing at least one resin material selected from the group consisting of epoxy-based resins, acrylic resins, urethane-based resins, silicone-based resins, polyamide-based resins, and polyolefin-based resins. In particular, when the water-stopping material contains an epoxy-based resin or an acrylic resin, a significant effect of suppressing cracking of the water-stopping material under a cooling-heating environment can be easily achieved by addition of the filler.

The water-stopping material may contain at least one additive selected from the group consisting of antioxidants, colorants, light absorbers, photostabilizers, antifoaming agents, curing agents, adhesion aids, leveling agents, surfactants, storage stabilizers, polymerization inhibitors, plasticizers, lubricants, and aging inhibitors. In this case, among the additives, an additive that is added in a particulate form, such as a lubricant, may have a particle size of 1 µm or more and 15% or less of the outer diameter of the strands. Such a particle size is the same as that defined for the filler above.

When the waterproof structure is a waterproof structure in which a spliced section in which conductors of a plurality of wires are exposed and joined to each other at an end portion thereof is accommodated in a cap member, and the inside of the cap member is filled with the water-stopping material, it is possible to easily produce a waterproof structure having high waterproofness at the spliced section of the wire end.

In this case, specific examples of the cap member includes those containing at least one resin material selected from the group consisting of polyolefins, halogen-based polymers, thermoplastic elastomers, and rubbers. When the water-stopping material is made of a cured product of a resin composition having photocurability, if a material that forms the cap has a transmittance to light capable of photocuring the resin composition that forms the water-stopping material, it is possible to cure the water-stopping material composition by light irradiation.

It is possible to adopt a configuration in which the cap is made of a heat-shrinkable material, and is heat-shrunk. In this case, when the resin material has heat curability, it is possible to cure the water-stopping material composition by heating, and also simultaneously heat-shrink the constituent material of the cap.

In the water stopping material, when, at an end of the plurality of wires that includes the spliced section, regions of: a space between the plurality of wires; a space between the conductor and the insulating covering of each of the plurality of wires; and a void between the strands constituting the conductor of each of the plurality of wires are filled with the water-stopping material, the water-stopping material filling those regions continuously seals them together. Accordingly, even if water comes into contact with the end portion of the wire bundle, water is prevented from entering the inside of the wires constituting the wire bundle, and the conductors are protected from contact with water.

DETAILED DESCRIPTION OF EMBODIMENTS

Hereinafter, a wire waterproof structure according to an embodiment disclosed in the present specification will be described in detail with reference to the drawings. The wire waterproof structure according to the embodiment disclosed in the present specification may be formed at any portion of any wire as long as the wire waterproof structure in which at least a partial region of a conductor including a plurality of strands is sealed with a water-stopping material. However, the following description will be given, taking, as an example, a case where the waterproof structure is formed at a spliced section in which exposed conductors are joined to each other at an end of a wire harness including a plurality of wires.

Wire Harness Having Waterproof Structure

Figure 1:
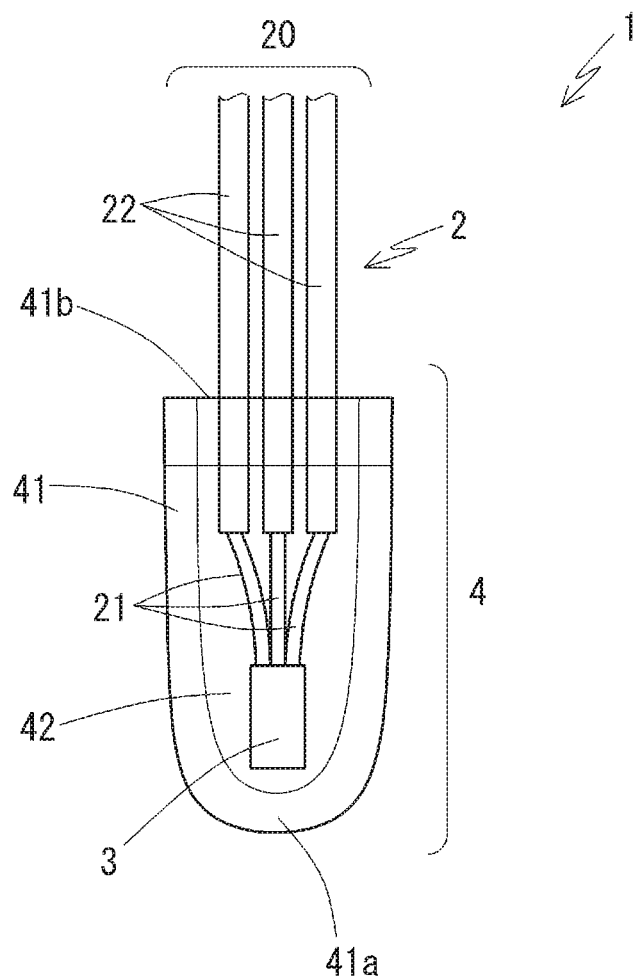
FIG. 1 is a perspective side view showing a configuration of an end portion of a wire harness having a waterproof structure according to an embodiment disclosed in the present specification.

FIG. 1 shows an example of the configuration of a wire harness 1 having a waterproof structure according to an embodiment disclosed in the present specification. The wire harness 1 includes a wire bundle 2, a spliced section 3 formed at an end of the wire bundle 2, a waterproofing section 4 provided at an end portion of the wire bundle 2 that includes the spliced section 3. The waterproofing section 4 is configured as the waterproof structure according to an embodiment disclosed in the present specification.

The wire bundle 2 is composed of a plurality of wires 20 that are bundled with axes thereof aligned with each other. In the illustrated embodiment, three wires 20 constitute the wire bundle 2. As can be seen from a cross section thereof shown in FIG. 2(a), each wire 20 is configured as an insulated wire including a long conductor 21, and an insulating covering 22 that covers the outer circumference of the conductor 21.

Figure 2A:
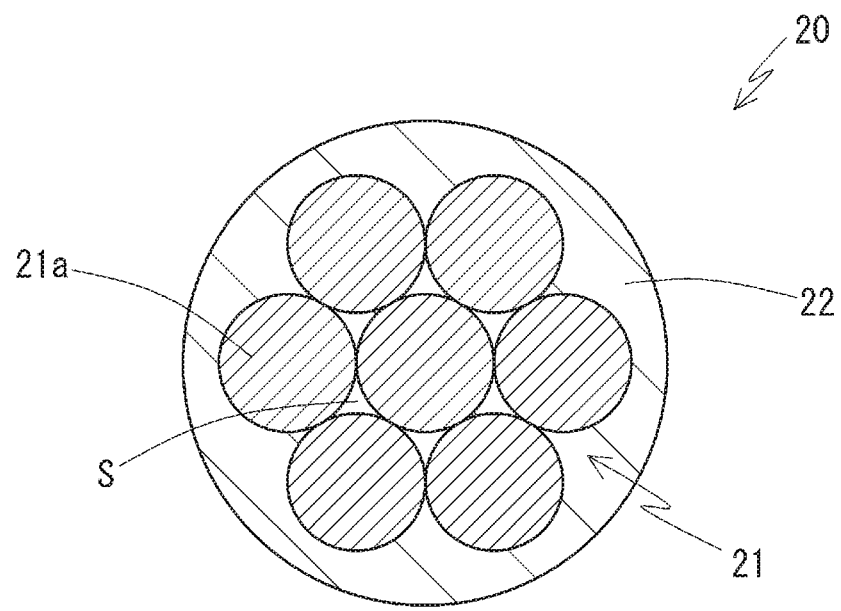
FIG. 2 shows diagrams showing wire cross sections, with FIG. 2(a) being an overall view and FIG. 2(b) being an enlarged view.

As shown in FIG. 2(a), the conductor 21 constituting each wire 20 is includes an assembly of a plurality of strands 21a. The plurality of strands 21a may simply be bundled with axes thereof aligned with each other, but are preferably twisted together so as to constitute the conductor 21 as a twisted wire. As each strand 21a, any known metal strand can be used. The metal material that forms the strand 21a is not particularly limited, and examples thereof include copper, copper alloys, aluminum, and aluminum alloys. The outer diameter of the strands 21a is not particularly limited, but is preferably 0.10 mm or more, for example, from the viewpoint of sufficiently securing, between the strands 21a, a void S in which a filler F contained in a water-stopping material 42, which will be described below, is disposed. Also, the outer diameter is preferably 0.5 mm or less, for example, from the viewpoint of the ease of performing resistance welding for forming the spliced section 3. Strands having an outer diameter in such a range are widely used as strands constituting conductors for automobile wires.

The material of the insulating covering 22 that is a component of the wire 20 is not particularly limited. Examples of the material that forms the insulating covering 22 include polyolefins such as polypropylene (PP), halogen-based polymers such as polyvinyl chloride (PVC), thermoplastic elastomers, and rubbers.

At an end of the wire bundle 2, the insulating coverings 22 of the wires 20 are removed, and the conductors 21 are exposed without being covered by the insulating coverings 22. The conductors 21 of the wires 20 constituting the wire bundle 2 are joined to each other at the exposed portions thereof, thus forming a spliced section 3. In the spliced section 3, the conductors 21 of the wires 20 are fixed by being joined by crimping, resistance welding, ultrasonic welding, or the like.

Also, a portion of the end of the wire bundle 2 that includes the spliced section 3 is covered by the waterproofing section 4. The waterproofing section 4 includes a cap 41 and a water-stopping material 42.

The cap 41 is made of an insulating resin material, is configured as a bottomed tubular body including a closed section 41a at one end and an open section 41b at the other end, and has a space thereinside. Into the cap 41, the wire bundle 2 is inserted from the open section 41b, and is accommodated in the inside space. A region of the wire bundle 2 that extends from the distal end of the spliced section 3 at the end to a part of the portion where the conductors 21 are covered by the insulating coverings 22 is accommodated in the inside space of the cap 41.

The resin material that forms the cap 41 is not particularly limited, and examples thereof include polyolefins such as polypropylene, halogen-based polymers such as polyvinyl chloride, thermoplastic elastomers, and rubbers. The cap 41 may be formed of a heat-shrinkable material, in which case, the cap 41 is preferably in a heat-shrunk state. As will be described below, when the water-stopping material 42 that is to fill the inside space of the cap 41 is made of a cured product of a photocurable resin composition, it is preferable that the material that forms the cap 41 has a transmittance to light that can be used for photocuring of the resin composition.

The inside space of the cap 41 is densely filled with the water-stopping material 42. Accordingly, a region, extending from the distal end of the spliced section 3 to a part of the portion where the conductors 21 are covered by the insulating coverings 22, of an end portion of the wire bundle 2 accommodated in the cap 41 is embedded in the water-stopping material 42, and is sealed with the water-stopping material 42. In the portion sealed with the water-stopping material 42, the water-stopping material 42 occupies and fills the spaces between the wires 20 constituting the wire bundle 2, the space between the insulating covering 22 and the conductor 21 of each of the wires 20, and the void S formed between the strands 21a constituting the conductor 21 of each of the wires 20.

As described above, in the wire harness 1, at an end of the wire bundle 2 that includes the spliced section 3, regions of the spaces between the plurality of wires 20, the space between the conductor 21 and the insulating covering 22 of each of the wires 20, and the void S between the strands 21a constituting the conductor 21 of each of the wires 20 are filled with the water-stopping material 42, and the water-stopping material 42 filling those regions continuously seals them together. Accordingly, even if water comes into contact with the end portion of the wire bundle 2, water is prevented from entering the inside of the wires 20 constituting the wire bundle 2, and the conductors 21 are protected from contact with water. Thus, the waterproofness for the conductors 21 is exerted by the water-stopping material 42. Additionally, because the portion sealed with the water-stopping material 42 is accommodated in the cap 41 in the waterproofing section 4, the cap 41 serves the function of complementing the waterproofness of the water-stopping material 42 and physically protecting the water-stopping material 42.

Constituent Material of Water-Stopping Material

Here, the details of the constituent material of the water-stopping material 42 will be described. The water-stopping material 42 contains a resin material and a filler F. The filler F is dispersed in the resin material. Preferably, the water-stopping material 42 is formed as an insulating material.

The resin material that forms the water-stopping material 42 is not particularly limited. Examples of the resin material include epoxy-based resins, acrylic resins, urethane-based resins, silicone-based resins, polyamide-based resins, and polyolefin-based resins. As will be described below, from the viewpoint of achieving a significant effect of suppressing cracking of the water-stopping material 42 under a cooling-heating environment by addition of the filler F, it is preferable to use an epoxy-based resin or an acrylic resin, which are the types of resins having a high coefficient of linear expansion and a high modulus of elasticity, and are likely to undergo cracking under a cooling-heating environment. One kind of the resin materials may be used alone, or two or more kinds thereof may be used as a mixture.

Preferably, the water-stopping material 42 is made of a cured product of a resin composition (water-stopping material composition) having curability. In that case, the water-stopping material composition that forms the water-stopping material 42 can be prepared in an uncured, flowable state and then be cured after being disposed in a place where the waterproofing section 4 is to be formed, including, for example, an end portion of the wire bundle 2 according to the present embodiment. By bringing the water-stopping material composition into contact with the wire 20 in a highly flowable state in this manner, it is possible to cause the water-stopping material composition to permeate even minute spaces such as the voids S between the strands 21a of the conductors 21 that form the wire 20, thus sealing the minute spaces with the water-stopping material 42. As a result, after curing, it is possible to ensure high waterproofness in each portion of the water-stopping material 42 forming the waterproofing section 4. Examples of the curability that the water-stopping material composition has include heat curability, moisture curability, two-part curability, and photocurability. Among these, it is preferable to include a heat curable resin because of the ease of curing.

The material that forms the filler F is not particularly limited, and examples thereof include organic polymer materials and inorganic materials. It is possible to impart a new property to the water-stopping material 42, or improve the properties of the water-stopping material 42, such as waterproofness, according to the material properties of the filler F. One kind of the filler F may be used alone, or two or more kinds thereof may be used as a mixture.

The average particle size (D50; hereinafter also may be simply referred to as the "particle size") of the filler F is 1 µm or more and 15% or less of the outer diameter of the strands 21a. The average particle size (D50) of the filler F can be evaluated by particle size distribution measurement using laser diffraction scattering, for example.

By setting the average particle size of the filler F to be 1 µm or more, it is possible to prevent an excessive increase in the viscosity of the water-stopping material composition to which the filler F has been added. If the viscosity of the water-stopping material composition excessively increases, the water-stopping material composition is less likely to permeate minute spaces such as the voids S between the strands 21a of the conductors 21. However, by preventing an excessive increase in the viscosity, it is possible to cause the water-stopping material composition to highly uniformly permeate even such minute spaces. By curing the water-stopping material composition in that state, it is possible to achieve high waterproofness in the entire region of the water-stopping material 42 that forms the waterproofing section 4.

Figure 2B:
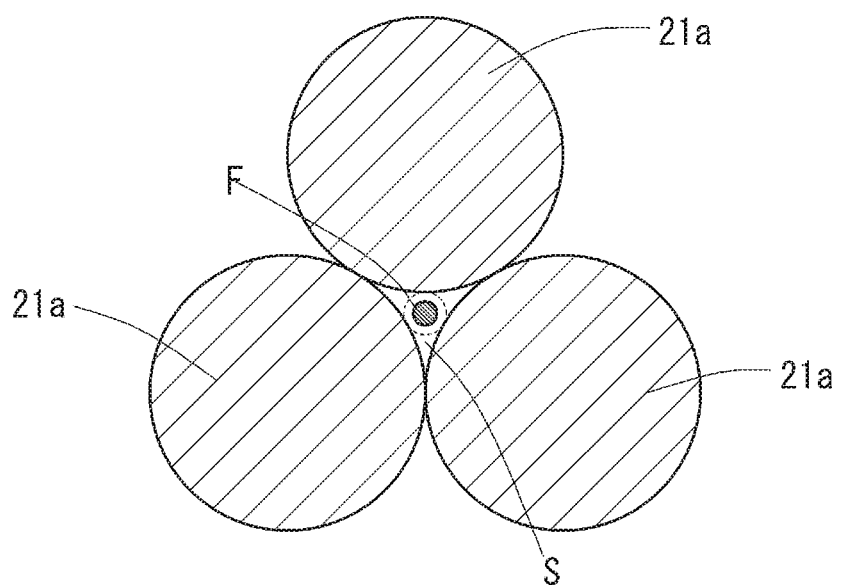

On the other hand, by setting the average particle size of the filler F to be 15% or less of the outer diameter of the strand 21a, the filler F can be easily distributed in minute spaces, including, for example, the voids S between the strands 21a of the conductors 21. As shown in FIG. 2(b), a minute void S whose perimeter is surrounded by a plurality of strands 21a is present between the strands 21a of each conductor 21. When the particle size of the filler F is larger than the size of the void S, the filler F cannot be disposed in the water-stopping material 42 that is to fill the void S. Then, the water-stopping material 42 in which the filler F is dispersed at a predetermined concentration can be disposed in a wide space such as the outside of the conductor 21; however, only the resin component that forms the water-stopping material 42 permeates the void S between the strands 21a, and the filler F will not be contained in the water-stopping material 42 filling the void F. In this case, the property imparting or improving effect of the filler F cannot be attained in the water-stopping material 42 filling the void S. For example, if the filler F is not disposed in the void S between the strands 21a when the filler F has the effect of suppressing cracking of the water-stopping material 42 under a cooling-heating environment, cracking under the cooling-heating environment may be likely to occur in the water-stopping material 42 filling the void S between the strands 21a, than in the water-stopping material 42 filling the other portions. Then, cracking is likely to occur in the water-stopping material 42, starting from the portion between the strands 21a, thus making it difficult to maintain sufficient waterproofness and insulation in the water-stopping material 42 that forms the waterproofing section 4.

When the particle size of the filler F is large, the filler F may clog the space between the strands 21a when the water-stopping material composition is caused to permeate the space between the strands 21a, and permeation of the water-stopping material composition may thus be prevented.

Then, the permeability of the water-stopping material composition is reduced, and a bubble-like space is formed between the strands 21a, which may cause a reduction in the waterproofness of the water-stopping material 42.

In contrast, when the particle size of the filler F is small enough to distribute the filler F in the minute void S between the strands 21a, and allow the filler F to be contained in the water-stopping material 42 filling the void S, the property imparting or improving effect of the filler F can also be attained in the water-stopping material 42 filling the voids S, as in the case of the water-stopping material 42 filling the other portions. For example, when the filler F has the effect of suppressing cracking of the water-stopping material 42 under a cooling-heating environment as described above, the occurrence of cracking due to the cooling-heating environment can also be effectively suppressed in the portions between the strands 21a. Consequently, it is possible to maintain high waterproofness and insulation by suppressing cracking under a cooling-heating environment in the entire region of the water-stopping material 42, including the portions between the strands 21a.

The maximum value of the average particle size of the filler F that can be disposed in the void S between the strands 21a can be defined as the maximum value of the diameter of the filler F that can be geometrically accommodated in the void S formed between strands 21a that are in contact with each other. When three cross-sectionally circular strands 21a each having an outer diameter of R are circumscribed with each other in an equilateral triangular configuration as shown in FIG. 2(b), the maximum value $r_0$ of the diameter of a spherical filler F that can be accommodated in the void S formed between the strands 21a is given by $r_0=(2/\sqrt{3}-1)R\approx 0.15$ R, as indicated by the dotted line in the drawing. Based on the maximum value $r_0$, the average particle size of the filler F added to the water-stopping material 42 may be $r_0$ or less. Roughly estimated, the average particle size of the filler F is preferably 15% or less of the outer diameter of the strand 21a. Additionally, in order for the filler F to be disposed with enough room in the void S between the strands 21a, it is more preferable that the average particle size is $r_0/2$ or less, or even $r_0/4$ or less. That is, the average particle size of the filler F may be 8% or less, or even 4% or less of the outer diameter of the strands 2a. Note that when strands having different outer diameters are used as the strands 21a constituting the conductor 21, the above-described upper limit may be defined using an average value, preferably, a minimum value of the outer diameters.

Additionally, in addition to being $r_0$ or less as described above, the average particle size of the filler F is preferably 20 μm or less. Furthermore, the average particle size may be 10 μm or less, or 5 μm or less. As described above, the outer diameter of the strands widely used for automobile wires is 0.10 mm or more, and an average particle size of 20 μm or less is small enough to allow entry of the filler F in the void S formed between such strands 21a.

The content of the filler F in the water-stopping material 42 is 1 mass % or more, relative to the amount of the resin material that forms the water-stopping material 42. When the content of the filler F is too small, the properties of the filler F cannot be sufficiently exerted in the water-stopping material 42. However, by setting the content to be 1 mass % or more, the property imparting or improving effect of the filler F can be easily achieved in the water-stopping material 42. The content of the filler F is further preferably 5 mass % or more.

On the other hand, the content of the filler F in the water-stopping material 42 is 20 mass % or less, relative to the amount of the resin material that forms the water-stopping material 42. When the content of the filler F in the water-stopping material 42 is too large, it is difficult to cause the water-stopping material composition to permeate minute spaces such as the voids S between the strands 21a because of an excessive increase in the viscosity of the water-stopping material composition to which the filler F has been added, or because of aggregation of the filler F. By setting the content of the filler F to be 20 mass % or less, it is possible to suppress an excessive increase in the viscosity of the water-stopping material composition and aggregation of the filler F, thus causing the water-stopping material composition to highly uniformly permeate even minute spaces such as voids S between the strands 21a. As a result, the water-stopping material 42 having high waterproofness can be formed in the entire region of the waterproofing section 4. The content of the filler F is further preferably 10 mass % or less.

In this manner, the upper limit and the lower limit of the particle size and the content of the filler F contained in the water-stopping material 42 are set as described above, whereby minute spaces, including, for example, the voids S between the strands 21a, can be highly uniformly filled with the water-stopping material 42, thus achieving the waterproofing effect by filling with the water-stopping material 42. In addition, the property imparting or improving effect by addition of the filler F, for example, the effect of improving the waterproofness, can be achieved in the entire region of the water-stopping material 42, including minute spaces such as the voids S between the strands 21a.

The viscosity of the water-stopping material composition that forms the water-stopping material 42 depends on both the particle size and the content of the filler F, and is preferably 9000 mPa·s or less at room temperature, from the viewpoint of sufficient permeation through the voids S between the strands 21a. Furthermore, the viscosity may be 5000 mPa·s or less.

Various additives other than the filler F can also be added to the water-stopping material 42 as long as the properties of the resin material and the filler F are not impaired. Examples of the additives include antioxidants, colorants, light absorbers, photostabilizers, antifoaming agents, curing agents, adhesion aids, leveling agents, surfactants, storage stabilizers, polymerization inhibitors, plasticizers, lubricants, and aging inhibitors. Note that, as in the case of the filler F described above, an additive that is added in a particulate form, such as a lubricant, preferably has a particle size of 1 μm or more and 15% or less of the outer diameter of the strands 21a.

Examples of Filler

As described above, the filler F contained in the water-stopping material 42 is not limited with regard to its material composition, and it is possible to impart a new property to the water-stopping material 42, or improve the properties of the water-stopping material 42, such as the waterproofness, according to the material composition. Examples of a preferred filler F will be described below.

(1) Soft Filler

Examples of a preferred filler F contained in the water-stopping material 42 include a soft filler. The soft filler generally has a durometer A hardness of 40 or less. By adding the soft filler to the water-stopping material 42, it is possible to suppress the occurrence of cracking in the water-stopping material 42 even under a cooling-heating environment, thus maintaining the waterproofness of the water-stopping material 42.

When the waterproofing section 4 is placed under a cooling-heating environment, cracking may occur in the water-stopping material 42 due to contraction and expansion of the resin material. In particular, when the resin material that forms the water-stopping material 42 is an epoxy-based resin or an acrylic resin, cracking is likely to occur in the water-stopping material 42 under a cooling-heating environment because these resin materials have a large coefficient of linear expansion and a high modulus of elasticity, and are highly brittle. Cracking of the water-stopping material 42 leads to a reduction in the waterproofness and the insulation of the water-stopping material 42.

Therefore, the filler F having a low hardness is added to the resin material so as to to reduce the modulus of elasticity of the water-stopping material 42 and impart toughness thereto, thus making it possible to suppress the occurrence of cracking under a cooling-heating environment. Cracking under a cooling-heating environment occurs due to thermal stress generated in the water-stopping material 42, and the thermal stress is proportional to a product of the coefficient of linear expansion and the modulus of elasticity (Young's modulus) of the material. Accordingly, it is possible to reduce the thermal stress and improve the thermal shock resistance by reducing the modulus of elasticity of the water-stopping material 42 by addition of the soft filler. That is, even when placed under a cooling-heating environment, the water-stopping material 42 is less likely to cause cracking, and the waterproofness of the water-stopping material 42 can be maintained. As described above, because the particle size and the content of the filler F are defined, the water-stopping material 42 containing the soft filler fills even minute spaces such as the voids S between the strands 21*a*, and it is thus possible to effectively suppress the occurrence of cracking starting from the portions between the strands 21*a* under a cooling-heating environment.

Examples of the constituent material of the soft filler include rubbers and elastomers. Specific examples thereof include acrylic rubbers, urethane rubbers, silicone rubbers, fluorine rubbers, chloroprene rubbers, nitrile-butadiene rubbers, styrene-butadiene rubbers, butadiene rubbers, ethylene-propylene rubbers, butyl rubbers, isoprene rubbers, polyester-based elastomers, polyamide-based elastomers, and polyurethane-based elastomers.

As described above, the modulus of elasticity of the water-stopping material 42 can be reduced by containing the soft filler in the resin material. For example, if the modulus of elasticity (Young's modulus) of the water-stopping material 42 can be reduced by 10% or more, or even 20% or more, by addition of the soft filler, the thermal shock resistance of the water-stopping material 42 can be effectively improved. The modulus of elasticity of the water-stopping material 42 can be evaluated in accordance with JIS K 7161.

(2) Hard Filler

Another example of the preferred filler F contained in the water-stopping material 42 is a hard filler. The hard filler generally has a Mohs hardness of 5 or more. By adding the hard filler to the water-stopping material 42, it is possible to suppress the occurrence of cracking in the water-stopping material 42 even under a cooling-heating environment, thus maintaining the waterproofness of the water-stopping material 42.

The mechanism by which the occurrence of cracking in the water-stopping material 42 under a cooling-heating environment is suppressed by addition of the hard filler is different from that in the case of the soft filler described above. Due to its high hardness, the hard filler reduces the coefficient of linear expansion of the water-stopping material 42 by being dispersed in the resin material.

As described above, because the thermal stress is proportional to a product of the coefficient of linear expansion and the modulus of elasticity (Young's modulus) of the material, reducing the coefficient of linear expansion of the water-stopping material 42 makes it possible to reduce the thermal stress generated in the water-stopping material 42 when placed under a cooling-heating environment, thus improving the thermal shock resistance of the water-stopping material 42. That is, even when placed under a cooling-heating environment, the water-stopping material 42 is less likely to cause cracking, and the waterproofness of the water-stopping material 42 can be maintained. As described above, because the particle size and the content of the filler F are defined, the water-stopping material 42 containing the hard filler fills even minute spaces such as the voids S between the strands 21*a*, thus making it possible to effectively suppress the occurrence of cracking starting from the portions between the strands 21*a* under a cooling-heating environment. Additionally, by addition of the hard filler, it is possible to achieve the effect of improving the mechanical strength of the water-stopping material 42, in addition to the effect of improving the thermal shock resistance.

Examples of the constituent material of the hard filler include inorganic compounds. Specific examples thereof include metal oxides, metal nitrides, metal carbides, metal oxynitrides, metal carbonitrides, metal carbonates, and metal silicates. Among these, metal oxides, metal nitrides, metal carbides, metal oxynitrides, and metal carbonitrides are preferable in that they have a particularly high hardness, and specific examples of those compounds include aluminum oxides, magnesium oxides, titanium oxides, zinc oxides, fused silicas, crystalline silicas, aluminum nitrides, silicon nitrides, and silicon carbides.

As described above, it is possible to reduce the coefficient of linear expansion of the water-stopping material 42 by containing the hard filler in the resin material. For example, if the coefficient of linear expansion of the water-stopping material 42 can be reduced by 5% or more, or even 10% or more, by addition of the hard filler, it is possible to effectively improve the thermal shock resistance of the water-stopping material 42. The coefficient of linear expansion of the water-stopping material 42 can be evaluated in accordance with JIS K 7197. If the tensile strength of the water-stopping material 42 can be increased by 20% or more, or even 40% or more, by addition of the hard filler, it is possible to effectively improve the mechanical strength of the water-stopping material 42. The tensile strength of the water-stopping material 42 can be evaluated in accordance with JIS K 7161.

Method for Forming Waterproof Structure

When the water-stopping material 42 is made of a cured product of a water-stopping material composition having curability, the waterproofing section 4 having high waterproofness can be easily formed using the water-stopping material composition having curability. Additionally, the formation of the waterproofing section 4 using the water-stopping material composition having curability can be easily performed by using the cap 41 as a constituent member of the waterproofing section 4.

To form the waterproofing section 4 in a region including the spliced section 3 at an end of the wire bundle 2, first, a water-stopping material composition is prepared by mixing the filler F and other additives with an uncured resin material. Then, the prepared water-stopping material composition is injected into the inside space of the cap 41 in advance. Additionally, an end portion, including a region extending from the distal end of the spliced section 3 to where the conductors 21 are covered by the insulating coverings 22, of the wire bundle 2 is immersed in the water-stopping material composition retained in the cap 41. At this time, the water-stopping material composition permeates the spaces between the wires 2, the space between the conductor 21 and the insulating covering 22 of each of the wires 2, and the void S between the strands 21a constituting each of the conductors 21.

As a result of curing the water-stopping material composition, the cured water-stopping material 42 is retained in the inside space of the cap 41, and it is thus possible to form a waterproofing section 4 in which the end portion, including the spliced section 3, of the wire bundle 2 is sealed. Curing of the water-stopping material 42 may be performed by a method corresponding to the curability that the water-stopping material composition has. For example, when the resin material has photocurability, the water-stopping material composition may be cured by light irradiation. On the other hand, when the resin material has heat curability, the water-stopping material composition may be cured by heating. At this time, when the cap 41 is made of a heat-shrinkable material, heat-shrinking for the constituent material of the cap 41 can also be performed simultaneously.

EXAMPLES

Examples and comparative examples will be described below. Note that the present disclosure is not limited by the following examples.
(1) Production of Samples In each of the following tests, a waterproofing section using a water-stopping material in a spliced section at a wire end was produced, and used as a sample.

To produce each sample, an insulated wire was used in which the outer circumference of a conductor formed by twisting together strands made of a copper alloy and having an outer diameter of 0.16 mm was covered by an insulating covering made of a PVC composition. At an end of such an insulated wire, the insulating covering was removed, and the conductor was exposed. Three such insulated wires were tied in a bundle, and the conductors exposed at the end were joined to each other by resistance welding, thus forming a spliced section.

Then, a heat-curable water-stopping material composition was injected into a cap made of a PVC composition, and an end portion, where the spliced section had been formed as described above, of the wire bundle was inserted into the water-stopping material composition. At this time, as shown in FIG. 1, a region extending from the distal end of the spliced section to the portion where the conductors were covered by the insulating coverings was immersed in the water-stopping material composition inside the cap. Then, the water-stopping material composition was cured by being heated from outside of the cap, using a heater.

The water-stopping material composition used above was prepared by mixing a predetermined filler with a heat-curable bisphenol-type epoxy resin to which an amine-based curing agent had been added. The type, the particle size, and the content of the filler of each of the samples according to the examples and the comparative examples were selected as shown in the following tables. At this time, the viscosity of each of the water-stopping material composition at room temperature was measured in accordance with JIS-K 7117-D, using a viscometer. In addition, the average particle size (D50) of each of the fillers was evaluated by particle size distribution measurement using laser diffraction scattering.
(2) Method of Leak Test after Endurance In order to evaluate the thermal shock resistance of the water-stopping material constituting the waterproofing section of each sample, a leak test after endurance was performed.

First, thermal shock was applied to each sample including the waterproofing section produced as described above. Specifically, a cycle in which each sample was held at −40° C. for 30 minutes, and thereafter held at 120° C. for 30 minutes was repeated a predetermined number of times. The number of repeated cycles was set to 500 cycles, 700 cycles, and 1000 cycles.

Then, a leak test was performed at room temperature for the sample in the initial state before application of thermal shock, and after application of thermal shock for each number of cycles. Specifically, the waterproofing section formed at an end of each sample was entirely immersed in water. Also, the wires constituting the wire bundle, except for one wire, were immersed in water along the entire length thereof. Then, compressed air at a pressure of 200 kPa was introduced from an opening, constituting an end on the side on which the waterproofing section was not provided, of the one wire that was not immersed in water.

At this time, whether any bubble was generated from the openings and the waterproofing sections of the other wires that were immersed in water was checked visually. When no bubble was generated from any portion, the sample was evaluated as "A", indicating high waterproofness. When generation of bubbles from any portion was confirmed, it was determined that the waterproofing section had a portion that was not sufficiently filled with the water-stopping material, or a portion in which cracking had occurred in the water-stopping material, and the sample was evaluated as "B", indicating low waterproofness. For all of the samples, the test with each cycle number was performed for three populations, and the leak test was performed for the bundle of the three insulated wires. Then, it was confirmed that the same evaluation result was obtained for each of the populations and each of the insulated wires. When the result "A", indicating high waterproofness, was obtained even after a large number of cooling-heating cycles, it can be considered that the water-stopping material has excellent thermal shock resistance.
(3) Confirmation of Properties of Filler First, in order to confirm a change in properties of the water-stopping material due to addition of the filler, the leak test after endurance was performed by the above-described method for samples produced using water-stopping materials to which fillers of different types had been added, and the thermal shock resistance of each sample was evaluated.

In addition, for some of the water-stopping materials, using a test piece produced by curing the water-stopping material composition, the modulus of elasticity and the tensile strength were measured in accordance with JIS K 7161, and the coefficient of linear expansion was measured in accordance with JIS K 7197. Here, a mean value between −40° C. and 120° C. was used as the coefficient of linear expansion.

Here, the following were used as the fillers. The content of each filler in the water-stopping material was 10 mass %, relative to the resin material.

Soft Filler
- Acrylic rubber filler: "KaneAce MP-91" manufactured by KANEKA CORPORATION, particle size 3 μm
- Thermoplastic elastomer filler: "Toraypearl TRC" manufactured by Toray Industries, Inc., particle size 5 μm Hard Filler
- Silicon nitride filler: manufactured by Denka Company Limited, particle size 4 μm
- Silica filler: manufactured by Tokai Chemical Industry Co., Ltd., particle size 5 μm
- Talc filler: manufactured by Nippon Talc Co., Ltd., particle size 5 μm Table 1 below shows the results of the leak test after endurance obtained when each of the fillers had been added to the water-stopping material, together with the properties of the water-stopping material.

in the modulus of elasticity of the water-stopping material, whereby the thermal stress generated in the water-stopping material under a cooling-heating environment is reduced, and cracking is less likely to occur in the water-stopping material.

On the other hand, when the hard filler was added, the coefficient of linear expansion was reduced. It can be interpreted that the addition of the hard filler results in a reduction in the coefficient of linear expansion of the water-stopping material, whereby the thermal stress generated in the water-stopping material under a cooling-heating environment is reduced, and cracking is less likely to occur in the water-stopping material. The addition of the hard filler also results in an improvement in the tensile strength of the water-stopping material.

In Example A5, in which the talc filler was used from among the hard fillers, the shock resistance was improved over Comparative Example A1, in which no filler was added. However, the degree of improvement in the thermal shock resistance is smaller than that in Examples A3 and A4, in which the silicon nitride filler and the silica filler were used. The reason for this is presumably that the effect of reducing the coefficient of linear expansion is small because the hardness of talc containing silicate is lower than the hardness of silicon nitride and silica.

TABLE 1

| Sample No. | | Com. Ex. A1 | Example A1 | Example A2 | Example A3 | Example A4 | Example A5 |
|---|---|---|---|---|---|---|---|
| Filler type | | None | Soft filler | | Hard filler | | |
| | | | Acrylic rubber | Thermoplastic elastomer | Silicon nitride | Silica | Talc |
| Average particle size (μm) | | — | 3 | 5 | 4 | 5 | 5 |
| Content (mass %) | | — | 10 | | | 10 | |
| Composition viscosity (mPa · s) | | 2000 | 3500 | 4500 | 4500 | 4000 | 5000 |
| Modulus of elasticity (MPa) | | 250 | — | 200 | — | — | — |
| Tensile strength (MPa) | | 70 | — | — | 90 | 100 | 50 |
| Coefficient of linear expansion (ppm/° C.) | | 200 | — | — | 180 | 190 | — |
| Leak test after endurance | 0 cycles (initial) | A | A | A | A | A | A |
| | 500 cycles | A | A | A | A | A | A |
| | 700 cycles | B | A | A | A | A | A |
| | 1000 cycles | B | A | A | A | A | B |

According to Table 1 above, in all of Examples A1 and A2, in which the soft filler was added, and Examples A3 to A5, in which the hard filler was added, the number of cycles of thermal shock during which high waterproofness was maintained in the leak test has increased, as compared with that in Comparative Example A1, in which no filler was added. It can be seen from that the addition of the soft filler or the hard filler to the resin material has improved the thermal shock resistance of the water-stopping material, thus making it possible to maintain high waterproofness even after thermal shock.

The mechanism by which the thermal shock resistance of the water-stopping material is improved can be considered to be different between the soft filler and the hard filler. When the soft filler was added, the modulus of elasticity of the water-stopping material was reduced. It can be interpreted that the addition of the soft filler results in a reduction (4) Evaluation of Effect of Particle Size of Filler Next, how the particle size of the filler affects the properties of the water-stopping material was examined. Here, samples produced using water-stopping material compositions to which fillers having different particle sizes had been added were subjected to the leak test after 1000 cycles of application of thermal shock, and the thermal shock resistance was evaluated.

As the filler, silicon nitride fillers having four different particle sizes (all manufactured by Denka Company Limited) were prepared. Each of the fillers was contained in the water-stopping material at a content of 10 mass %, relative to the resin material.

Table 2 shows the test results obtained when the filler having each of the particle sizes had been added. Here, Example B2 and Comparative Example B1 are respectively the same as Example A3 and Comparative Example A1 in Table 1.

TABLE 2

| Sample No. | | Com. Ex. B1 | Com. Ex. B2 | Example B1 | Example B2 | Com. Ex. B3 |
|---|---|---|---|---|---|---|
| Filler type | | None | | Silicon nitride | | |
| Average particle size (μm) | | — | 0.7 | 1 | 4 | 28 |
| Content (mass %) | | — | | 10 | | |
| Composition viscosity (mPa · s) | | 2000 | 10000 | 6500 | 4500 | 3900 |
| Leak test after endurance | 0 cycles (initial) | A | B | A | A | B |
| | 1000 cycles | B | B | A | A | B |

According to Table 2, the waterproofness after 1000 cycles of application of thermal shock in each of Examples B1 and B2, in which the average particle size of the filler are 1 μm and 4 μm, is higher than that in Comparative Example B1, in which no filler is contained. It can be interpreted that, by adding a filler having an average particle size in such a range to the water-stopping material composition, the water-stopping material composition permeates minute spaces such as the voids between the strands, and the filler is contained in the water-stopping material composition filling such spaces, and the effect of improving the thermal shock resistance by addition of the hard filler can be achieved in the entire region of the water-stopping material, including those minute spaces.

On the other hand, the waterproofness in Comparative Example B2, in which the particle size of the filler is less than 1 μm, is lower than that in Comparative Example B1, in which no filler is contained, from the initial state before application of thermal shock. This corresponds to the fact that a composition viscosity that is significantly higher than that in Comparative Example B1 is observed in Comparative Example B2, and it can be considered that mixing a filler having a small particle size has resulted in an increase in the viscosity of the water-stopping material composition, and the water-stopping material composition did not sufficiently permeate minute spaces such as the voids between the strands. Here, the maximum value of the particle size of the filler, which is defined as 15% or less of the outer diameter of the strands, is 24 μm. Accordingly, the waterproofness in Comparative Example B3, in which the particle size of the filler exceeds its maximum value, is also lower than that in Comparative Example B1, in which no filler is contained, from the initial state before application of thermal shock. It can be interpreted that this is attributed to the fact that the permeability of the water-stopping material composition was reduced as a result of the filler clogging the spaces between the strands when the water-stopping material composition was caused to permeate the spaces between the strands, and bubble-like spaces that could cause a leak were formed between the strands.

(5) Evaluation of Effect of Content of Filler

Finally, how the content of the filler in the water stopping material affects the properties of the water-stopping material was examined. Here, the thermal shock resistance was evaluated for samples produced using water-stopping material compositions having different filler contents.

As the filler, the acrylic rubber filler (average particle size: 3 μm) and the silicon nitride filler (average particle size: 4 μm) that are the same as those used in the test for "Confirmation of Properties of Filler" above were used. Each of the contents was varied as shown in Tables 3 and 4. The contents are each shown as the ratio (unit:mass %) to the amount of the resin material.

Tables 3 and 4 show the test results obtained when the fillers had been added at each of the contents. Here, Examples C3 and C7 and Comparative Example C1 are respectively the same as Examples A1 and A3 and Comparative Example A1 in Table 1.

TABLE 3

| Sample No. | | Com. Ex. C1 | Com. Ex. C2 | Example C1 | Example C2 | Example C3 | Example C4 | Com. Ex. C3 |
|---|---|---|---|---|---|---|---|---|
| Filler type | | None | | | Acrylic rubber | | | |
| Average particle size (μm) | | — | | | 3 | | | |
| Content (mass %) | | — | 0.5 | 1 | 5 | 10 | 20 | 30 |
| Composition viscosity (mPa · s) | | 2000 | 2000 | 2200 | 2800 | 3500 | 7000 | 14000 |
| Leak test after endurance | 0 cycles (initial) | A | A | A | A | A | A | B |
| | 500 cycles | A | A | A | A | A | A | B |
| | 700 cycles | B | B | A | A | A | A | B |
| | 1000 cycles | B | B | A | A | A | A | B |

TABLE 4

| Sample No. | | Com. Ex. C1 | Com. Ex. C4 | Example C5 | Example C6 | Example C7 | Example C8 | Com. Ex. C5 |
|---|---|---|---|---|---|---|---|---|
| Filler type | | None | | | Silicon nitride | | | |
| Average particle size (μm) | | — | | | 4 | | | |
| Content (mass %) | | — | 0.5 | 1 | 5 | 10 | 20 | 30 |
| Composition viscosity (mPa · s) | | 2000 | 2200 | 2500 | 3200 | 4500 | 8800 | 20000 |
| Leak test after | 0 cycles (initial) | A | A | A | A | A | A | B |

TABLE 4-continued

| Sample No. | | Com. Ex. C1 | Com. Ex. C4 | Example C5 | Example C6 | Example C7 | Example C8 | Com. Ex. C5 |
|---|---|---|---|---|---|---|---|---|
| endurance | 500 cycles | A | A | A | A | A | A | B |
| | 700 cycles | B | B | A | A | A | A | B |
| | 1000 cycles | B | B | A | A | A | A | B |

According to Tables 3 and 4, for all of the fillers, in the examples in which the filler content is in the range of 1 mass % or more and 20 mass % or less, the waterproofness can be maintained even after many cooling-heating cycles than in the cases where no filler is contained, and it can be seen that the thermal shock resistance has been improved. This seems to be attributed to the fact that the water-stopping material composition highly uniformly permeates even minute spaces such as the voids between the strands due to an appropriate content of the filler, and that the filler is contained in the water-stopping material composition filling such spaces.

On the other hand, for all of the fillers, in the cases where the content is less than 1 mass % (Comparative Examples C2, C4), the thermal shock resistance has not been improved as compared with the cases where no filler is contained. It can be considered that the effect of improving the thermal shock resistance by the filler has not been sufficiently exerted because the content of the filler is too small. Furthermore, for all of the fillers, in the cases where the content exceeds 20 mass % (Comparative Examples C3, C5), the waterproofness of the water-stopping material is reduced as compared with that in the cases where no filler is contained, and only low waterproofness was achieved from the initial state before application of thermal shock. It can be interpreted that this is attributed to the fact that the viscosity of the water-stopping material composition was excessively increased due to a large amount of the filler contained, and the water-stopping material composition did not sufficiently permeate minute spaces such as the void between the strands, thus making it impossible to form a waterproofing section having sufficient waterproofness.

Although an embodiment disclosed in the present specification has been described in detail, the present disclosure is by no means limited to the above-described embodiment, and various modifications may be made without departing from the gist thereof.

As described above, the waterproof structure according to the embodiment disclosed in the present specification is not limited to a configuration provided at an end spliced section in which conductors of a plurality of wires are joined at an end portion, and can be applied to various types of wires and positions. For example, the waterproof structure may be provided at a spliced section in which a plurality of wires are joined at an intermediate portion in the longitudinal direction of the wires. Alternatively, the waterproof structure may be provided at a portion where a conductor including a plurality of strands is exposed from an insulating covering at an end or intermediate portion of a single wire, rather than a wire bundle.

This application claims priority to Japanese Patent Application No. 2018-66578 filed on Mar. 30, 2018, the disclosure of which is incorporated in its entirety herein by reference.

The invention claimed is:

1. A wire waterproof structure comprising:
a water-stopping material, wherein:
the water-stopping material is configured to seal at least a partial region of a conductor comprising an assembly of a plurality of strands, the water-stopping material contains a resin material, and a filler dispersed in the resin material, and
the filler has an average particle size of 1 μm or more and 15% or less of an outer diameter of the strands, and a content in the water-stopping material of 1 mass % or more and 20 mass % or less, relative to the resin material.

2. The wire waterproof structure according to claim 1, wherein the average particle size of the filler is 10 μm or less.

3. The wire waterproof structure according to claim 1, wherein the filler is a soft filler made of a rubber or an elastomer.

4. The wire waterproof structure according to claim 3, wherein the soft filler contains at least one material selected from the group consisting of acrylic rubbers, urethane rubbers, silicone rubbers, fluorine rubbers, chloroprene rubbers, nitrile-butadiene rubbers, styrene-butadiene rubbers, butadiene rubbers, ethylene-propylene rubbers, butyl rubbers, isoprene rubbers, polyester-based elastomers, polyamide-based elastomers, and polyurethane-based elastomers.

5. The wire waterproof structure according to claim 3, wherein a Young's modulus of the water-stopping material to which the soft filler has been added is at least 10% less than a Young's modulus thereof to which the soft filler is not added.

6. The wire waterproof structure according to claim 1, where the filler is a hard filler made of an inorganic compound.

7. The wire waterproof structure according to claim 6, wherein the hard filler contains at least one compound selected from the group consisting of metal oxides, metal nitrides, metal carbides, metal oxynitrides, metal carbonitrides, metal carbonates, and metal silicates.

8. The wire waterproof structure according to claim 6, wherein a coefficient of linear expansion of the water-stopping material to which the hard filler has been added is at least 5% lower than a coefficient of linear expansion thereof to which the hard filler is not added.

9. The wire waterproof structure according to claim 6, wherein a tensile strength of the water-stopping material to which the hard filler has been added is at least 20% higher than a tensile strength thereof to which the hard filler is not added.

10. The wire waterproof structure according to claim 1, wherein the water-stopping material is made of a cured product of a resin composition having at least one curability selected from the group consisting of heat curability, moisture curability, two-part curability, and photocurability.

11. The wire waterproof structure according to claim 10, wherein viscosity of the resin composition that is not cured is 9000 mPa·s or less at room temperature.

12. The wire waterproof structure according to claim 1, wherein the water-stopping material contains at least one resin material selected from the group consisting of epoxy-based resins, acrylic resins, urethane-based resins, silicone-based resins, polyamide-based resins, and polyolefin-based resins.

13. The wire waterproof structure according to claim 1, wherein the water-stopping material contains at least one additive selected from the group consisting of antioxidants, colorants, light absorbers, photostabilizers, antifoaming agents, curing agents, adhesion aids, leveling agents, surfactants, storage stabilizers, polymerization inhibitors, plasticizers, lubricants, and aging inhibitors.

14. The wire waterproof structure according to claim 13, wherein, among the additives, a particulate additive has a particle size of 1 μm or more and 15% or less of an outer diameter of the strands.

15. The wire waterproof structure according to claim 1, wherein a spliced section in which conductors of a plurality of wires are exposed and joined to each other at an end portion thereof is accommodated in a cap member, and the inside of the cap member is filled with the water-stopping material.

16. The wire waterproof structure according to claim 15, wherein the cap member contains at least one resin material selected from the group consisting of polyolefins, halogen-based polymers, thermoplastic elastomers, and rubbers.

17. The wire waterproof structure according to claim 15, wherein the water-stopping material is made of a cured product of a resin composition having photocurability, and
a material that forms the cap has a transmittance to light capable of photocuring the resin composition that forms the water-stopping material.

18. The wire waterproof structure according to claim 15, wherein the cap is made of a heat-shrinkable material, and is heat-shrunk.

19. The wire waterproof structure according to claim 15, wherein, at an end of the plurality of wires that includes the spliced section, regions of:
a space between the plurality of wires;
a space between the conductor and the insulating covering of each of the plurality of wires; and
a void between the strands constituting the conductor of each of the plurality of wires are filled with the water-stopping material.

20. The wire waterproof structure according to claim 1, wherein no bubble was generated from any portion of a sample of the wire waterproof structure applied to an exposed end of an insulating wire immersed in water and held at −40° C. for 30 minutes, then held at 120° C. for 30 minutes, for 700 cycles, and then compressed air at a pressure of 200 kPa introduced from an opening constituting an end on a side on which the waterproofing structure is not provided.

* * * * *